US009843222B2

United States Patent
Yeon et al.

(10) Patent No.: US 9,843,222 B2
(45) Date of Patent: *Dec. 12, 2017

(54) UNINTERRUPTIBLE POWER SUPPLY SYSTEM FOR PREVENTING CHARGING OF BATTERIES AND METHOD FOR CONTROLLING UNINTERRUPTIBLE POWER SUPPLY SYSTEM

(71) Applicant: LG CNS CO., LTD., Seoul (KR)

(72) Inventors: In Chol Yeon, Seoul (KR); Bon Jun Koo, Seoul (KR); Dong Young Shin, Seoul (KR); Byeong Gyu Hyeon, Seoul (KR)

(73) Assignee: LG CNS CO., LTD., Seoul (KR)

( * ) Notice: Subject to any disclaimer, the term of this patent is extended or adjusted under 35 U.S.C. 154(b) by 397 days.

This patent is subject to a terminal disclaimer.

(21) Appl. No.: 14/604,234

(22) Filed: Jan. 23, 2015

(65) Prior Publication Data

US 2016/0190864 A1    Jun. 30, 2016

(30) Foreign Application Priority Data

Dec. 29, 2014   (KR) .......................... 10-2014-0192698

(51) Int. Cl.
*H02J 7/00*     (2006.01)
*H02J 9/06*     (2006.01)

(52) U.S. Cl.
CPC ............ *H02J 9/062* (2013.01); *H02J 7/0029* (2013.01); *H02J 2007/0037* (2013.01)

(58) Field of Classification Search
None
See application file for complete search history.

(56) References Cited

U.S. PATENT DOCUMENTS

| 7,307,360 | B2 * | 12/2007 | Gonzales | G06F 1/30 307/139 |
| 2008/0203820 | A1 * | 8/2008 | Kramer | H02J 3/38 307/64 |
| 2010/0253147 | A1 * | 10/2010 | Ogg | H02J 9/061 307/65 |
| 2016/0190865 | A1 * | 6/2016 | Shin | H02J 9/062 307/65 |

FOREIGN PATENT DOCUMENTS

| KR | 2003-0094496 | 12/2003 |
| KR | 10-2014-0072692 | 6/2014 |
| KR | 10-2014-0113185 | 9/2014 |

* cited by examiner

*Primary Examiner* — Long Nguyen
(74) *Attorney, Agent, or Firm* — Lee, Hong, Degerman, Kang & Waimey

(57) ABSTRACT

An uninterruptible power supply (UPS) system for preventing charging of batteries is provided. The system includes a UPS configured to supply power from a grid to a load, a battery unit configured to be charged with the power supplied from the UPS, and a controller configured to selectively supply the power from the grid to the UPS and selectively connect or disconnect a charging path between the UPS and the battery unit.

20 Claims, 4 Drawing Sheets

UNINTERRUPTIBLE POWER SUPPLY SYSTEM FOR PREVENTING CHARGING OF BATTERIES AND METHOD FOR CONTROLLING UNINTERRUPTIBLE POWER SUPPLY SYSTEM

CROSS-REFERENCE TO RELATED APPLICATION

This application claims the benefit and right of priority to Korean Patent Application No. 10-2014-0192698, filed on Dec. 29, 2014, the contents of which is incorporated herein by reference in its entirety.

FIELD OF THE INVENTION

The present invention relates to an uninterruptible power supply (UPS) system for preventing charging of batteries and a method of controlling the UPS system and more particularly, to a UPS system for preventing charging of batteries that is capable of selectively connecting or disconnecting a charging path between a UPS and a battery unit and a method of controlling the UPS system.

DISCUSSION OF RELATED ART

A UPS according to the related art directly manages charging and discharging of batteries. When power is supplied from a grid, not only power supplied to a load but also power for charging a battery should be consumed until the battery is completely charged.

The UPS may supply power discharged from the battery to the load by opening an internal switch during a maximum load period. When the battery is completely discharged before the maximum load period ends, the internal switch is closed to receive power from the grid.

However, the UPS also consumes additional power for charging the battery while providing power supplied from the grid to the load. Therefore, although the battery is discharged in the maximum load period to save high electrical fees, the battery is likely to be recharged at high electrical fees.

Accordingly, since the battery is unnecessarily repeatedly charged and discharged during the maximum load period, power efficiency and the lifespan of the battery decrease. Therefore, a method for solving this problem is needed.

SUMMARY OF THE INVENTION

In one aspect of the invention, an uninterruptible power supply (UPS) system is provided. The system includes a UPS configured to supply power from a grid to either a load or a batter array, the battery array configured to provide power to the UPS or be charged with power supplied from the UPS and a controller configured to selectively supply the power from the grid or the battery array to the load via the UPS and selectively supply the power from the grid to the battery array by controlling a charging path between the UPS and the battery array.

It is contemplated that the controller includes a first power switch connected between the grid and the UPS and is further configured to open the first power switch during a first event period such that power from the grid is not provided to the UPS and close the first power switch during a second event period such that power from the grid is provided to the UPS. It is further contemplated that the controller further includes a second power switch and a diode connected in parallel with the first power switch and is further configured to open the first power switch and second power switch such that power stored in the battery array is discharged to the UPS via the diode, open the first power switch and close the second power switch such that power stored in the battery array is discharged to the UPS via the diode and second power switch in parallel and close the first power switch and second power switch such that power from the grid is supplied to charge the battery array.

It is contemplated that the controller is further configured to close the first power switch and open the second power switch when power stored in the battery array is discharged to a predetermined level such that power from the grid is supplied the to the load and not to the battery array such that the battery array is not charged with the power from the grid. It is further contemplated that the first event period is a peak power-consumption period during which a maximum amount of power is used and the second event period is a period other than the first event period.

It is contemplated that the controller is further configured to selectively control power stored in the battery array to be discharged in consideration of electrical fees. It is further contemplated that the controller is further configured to compare an electrical fee related to charging the battery array with an electrical fee for discharging the battery array, control less power stored in the battery array to be discharged when the electrical fee related to charging is less than the electrical fee related to discharging and control more power stored in the battery array to be discharged when the electrical fee related to charging is greater than the electrical fee related to discharging.

It is contemplated that the controller is further configured to selectively control power stored in the battery unit to be discharged in consideration of a lifespan of the battery array. It is further contemplated that the controller is further configured to selectively control the charging path to be disconnected or connected in order to maintain a state of charge of the battery array within a predetermined range.

It is contemplated that the controller is further configured to connect the charging path when a state of charge (SoC) of the battery array is less than the predetermined level and disconnect the charging path when the SoC of the battery array is equal to or greater than the predetermined level. It is further contemplated that the battery array comprises a plurality battery units and the controller is further configured to control connection and disconnection of charging paths between the plurality of battery units and the UPS according to a predetermined priority.

It is contemplated that the controller includes a communication and sensing controller configured to communicate with an energy management system (EMS), the UPS, and a battery management system (BMS) that monitors a state of the battery array in order to measure a voltage of the battery array in real time. It is further contemplated that the communication and sensing controller is further configured to provide a communication interface of at least the UPS, the BMS or the EMS.

It is contemplated that the communication and sensing controller is further configured to disconnect the grid, the UPS, and the battery array from one another via an emergency generator (EMG) switch. It is further contemplated that the communication and sensing controller is further configured to provide a user interface via which a flow of the power is displayed. Moreover, it is contemplated that the controller is further configured to collect information related to the UPS and the battery array and control the charging path based on the collected information.

In another aspect of the invention, a method of controlling an uninterruptible power supply (UPS) system is provided. The method includes selectively supplying power from a grid or a battery array to a load via the UPS and selectively supplying the power from the grid to the battery array by controlling a charging path between the UPS and the battery array.

It is contemplated that selectively supplying the power from the grid to the a battery array includes controlling the charging path such that the battery array is not charged with power from the grid when power stored in the battery array is discharged to a predetermined level. It is further contemplated that the method further includes not providing power from the grid to the UPS during a first event period and providing power from the grid to the UPS during a second event period where the first event period is a peak power-consumption period during which a maximum amount of power is used and the second event period is a period other than the first event period. Moreover, it is contemplated that the method further includes selectively controlling power stored in the battery array to be discharged in consideration of at least electrical fees or a lifespan of the battery array.

BRIEF DESCRIPTION OF THE DRAWINGS

The objects, features, and advantages of the present invention will become more apparent to those of ordinary skill in the art by describing in detail embodiments with reference to the accompanying drawings, in which.

DETAILED DESCRIPTION OF EMBODIMENTS

Figure 1:
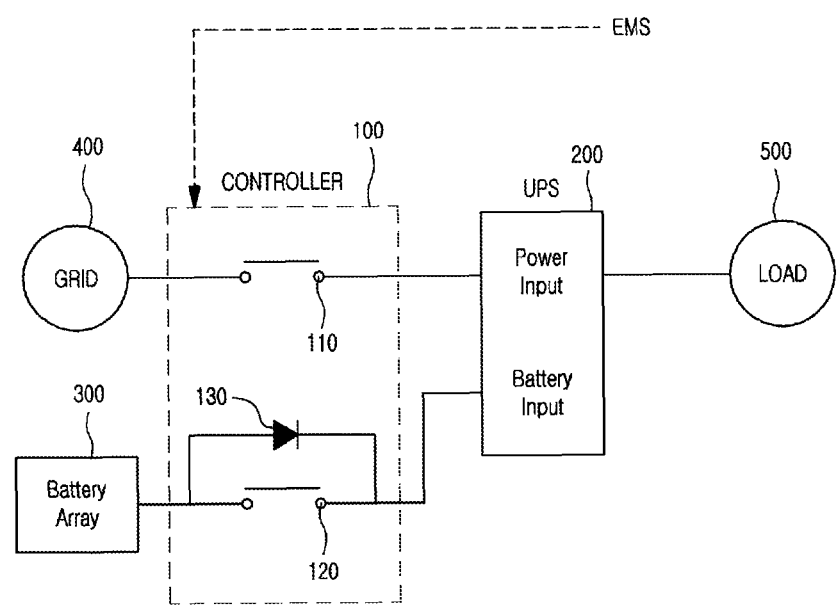
FIG. 1 illustrates a UPS system capable of preventing charging of batteries according to an embodiment of the present invention.

Reference will now be made in detail to embodiments of the present invention, examples of which are illustrated in the accompanying drawings, wherein like reference numerals refer to like elements throughout. The present invention may have different forms and should not be construed as being limited to the described embodiments. In the drawings, components are not necessary to explain the present invention are omitted.

In the following description, well-known functions or constructions are not described in detail if it is determined that such description would obscure the invention due to unnecessary detail. Embodiments of the present invention will be described in detail with reference to the accompanying drawings.

FIG. 1 is a block diagram illustrating an uninterruptible power supply (UPS) system capable of preventing charging of batteries according to an embodiment of the present invention. As illustrated in FIG. 1, the UPS system includes a controller 100, a UPS 200, and a battery array 300. The UPS system may directly use a power infrastructure for the UPS that has been previously installed in a building and increase battery capacity using the battery array, thereby enabling both functions of the UPS and an energy storage system (ESS) to be performed without incurring additional costs and risks associated with setting up new power equipment.

The controller 100, which may be a switchable-UPS controller, controls power supplied from a grid 400 to be supplied to the UPS 200 and controls charging and discharging of the battery array 300. The controller may selectively supply power to the UPS and selectively connect or disconnect a charging path between the UPS and the battery array to control charging or discharging of the battery array.

The controller 100 may control a load 500 such as a load installed in a factory or building, which currently uses power supplied from the UPS 200 to use power stored in the battery array 300 during a peak power-consumption period. The controller may block power from being supplied by the grid to the UPS during a first event period, such as a peak power-consumption period during which a maximum amount of power is used.

The controller 100 may control power supplied from the grid 400 to be supplied to the load 500 via the UPS 200 during periods other than the first event period. The controller may control power to be supplied from the grid to the UPS via a first power switch 110 and block power from being supplied from the grid to the UPS via the first power switch.

The first power switch 110 may be located halfway between a power line connecting the grid 400 and a power input unit of the UPS 200. The controller 100 may control power to be supplied to the UPS by closing the first power switch and block power from being supplied to the UPS by opening the first power switch.

During the first event period, the controller 100 may block power from being supplied from the grid 400 and control power stored in the battery array 300 to be supplied to the load 500 instead of the power supplied from the grid. During other periods, the controller may connect a charging path to supply power from the grid to the battery array via the UPS 200 in order to charge the battery array.

The controller 100 may control the power stored in the battery array 300 to be supplied to the load 500 by discharging only the power stored in the battery array via a diode 130. The controller may also close a second power switch 120 to discharge the power stored in the battery array via the second power switch and diode in parallel.

The controller 100 may block power from being supplied from the grid 400 to the battery array 300 in order to not to charge the battery array and control power to be supplied from the grid to the battery array in order to charge the battery array via the second power switch 120. The second power switch may be located halfway between a power line connecting the battery array and a battery input unit of the UPS 200 to provide a charging path and the diode 130 may be located in parallel with the charging path.

The controller 100 may open the second power switch 120 to block power from being supplied from the grid 400 to the battery array 300 in order to disconnect the charging path and may close the second power switch to supply power from the grid to the battery array 300 in order to connect the charging path. The controller may open the second power switch to discharge only power stored in the battery array via the diode 130 and close the second power switch to discharge power stored in the battery array via the diode and second power switch in parallel. In this way, even if the second power switch is open to disconnect the charging path, the controller may control discharging to be performed via the diode connected in parallel to the second power switch.

According to an embodiment, the controller 100 may control power stored in the battery array 300 to be supplied to the load 500 while opening the first power switch 110 to simulate a power failure. The controller may check a result of the simulated power failure by measuring a voltage of the battery array that decreases such that it is proportional to the amount of power discharged from the battery array. When the second power switch 120 is closed, the battery array is charged with power supplied from the grid 400 and the controller may check if the amount of power charged in the battery array increases in order to determine whether the battery array is charged.

According to an embodiment, the controller 100 may open the first power switch 110 during the first event period to control the UPS 200 to determine that a power failure occurs and to supply power stored in the battery array 300 to the load 500. Thereafter, when the power stored in the battery array is discharged to a predetermined level or more during the first event period, the controller may open the second power switch 120 to disconnect the charging path in order to not charge the battery array while closing the first power switch to supply power from the grid 400 to the load.

For example, if power stored in the battery array 300 is 500 kW and power to be used in the UPS 200 in an emergency situation is 100 kW, the controller 100 may close the first power switch 110 and open the second power switch 120 when 400 kW or more of the power stored in the battery array is discharged during the first event period. In this way, when all the power stored in the battery array except for the power to be used in the UPS in an emergency situation is discharged, the controller may control the power stored in the battery array to not be discharged any more.

According to an embodiment, when a power failure occurs while the second power switch 120 is open such that the charging path is disconnected, the controller 100 controls the power stored in the battery array 300 to be supplied via the diode 130 so that the power may be supplied to the load 500 via the UPS 200. This prevents accidents from occurring due to the power failure.

In the case of an emergency situation, such as a power failure, the controller 100 may close the second power switch 120 to discharge power in parallel, thereby preventing a decrease in the efficiency of power discharge caused when the power is discharged only via the diode 130. The controller may control power stored in the battery array 300 to be discharged in order to save electrical fees related to the power stored in the battery array.

The controller 100 may compare an electrical fee related to charging power stored in the battery array 300 with an electrical fee related to discharging power stored in the battery array and control the power stored in the battery array to be discharged when the electrical fee related to charging is greater than the electrical fee related to discharging. For example, if an electrical fee related to charging the battery array during a heavy load condition is greater than an electrical fee related to discharging the battery array, the controller may close the second power switch 120 to discharge power stored in the battery array in parallel via the second power switch and the diode 130. Since the electrical fee related to charging the battery array is greater than the electrical fee related to discharging the battery array, the controller may control more power to be discharged to save fees.

If an electrical fee related to charging the battery array is less than an electrical fee related to discharging the battery array during the heavy load condition, the controller 100 may open the second power switch 120 to discharge only the power stored in the battery array via the diode 130. Since the electrical fee related to charging the battery array is less than the electrical fee related to discharging the battery array, the controller may control less power to be discharged to save fees.

When the power stored in the battery array 300 is controlled to be discharged, the controller 100 may control the power stored in the battery array to be discharged in consideration of both saving electrical fees and a decrease in the lifespan of the battery array. When the battery array is repeatedly charged and discharged, the lifespan of the battery array may decrease. The controller may check the lifespan of the battery array and control the power stored in the battery array to be discharged when the lifespan is longer than a predetermined period and control the power stored in the battery array to not to be discharged when the lifespan is shorter than the predetermined period.

The controller 100 may measure a voltage of the battery array 300 in real time and provide a user with a result of the measurement via a user interface or store the result in a storage device such as a memory. The controller may control the charging path to be selectively disconnected or connected so that a state of charge (SoC) of the battery array may be maintained in a predetermined range based on the measured voltage.

When the SoC of the battery array is less than a predetermined value, the controller may close the second power switch 120 in order to connect the charging path to charge the battery array. When the SoC of the battery array is equal to or greater than the predetermined value, the controller may open the second power switch in order to disconnect the charging path and not charge the battery array.

The controller 100 may control an operation of the second power switch 120 periodically or according to an interruption method. Alternatively, the controller may control an operation of the second power switch in order to disconnect or connect the charging path according to a predetermined priority.

The controller 100 may control an operation of the second power switch 120 to block overcharging or overdischarging of the battery array 300, overcurrent, or overvoltage, and control the operation of the second power switch according to a predetermined priority when an abnormal situation occurs. For example, if a priority assigned to a battery overvoltage/overcurrent prevention function when a power failure occurs is lower than a priority assigned to a discharging operation, the controller may control the operation of the second power switch according to the priorities without considering the battery overvoltage/overcurrent prevention function. The controller may control charging paths between battery units included in the battery array and the UPS 200 to be selectively disconnected or connected.

The controller 100 may include a communication and sensing controller (not shown) that communicates with at least an energy management system (EMS), the UPS 200, and a battery management system (BMS) and measures a voltage of the battery array 300 in real time. The communication and sensing controller may measure the voltage of the battery array or voltages of backup battery units included in the battery array in real time. The communication and sensing controller may provide at least a communication interface of the UPS, a communication interface of the BMS or a communication interface of the EMS.

The communication interface of the UPS 200 is a communication interface that a manufacturer provides for predefining a command and performing a function such as a simulated power failure without operating a power switch each time. The communication interface of the EMS may be used to provide information related to fee policies and peak power-consumption periods and to provide information related to the controller 100. The communication interface of the BMS may be used to monitor a state of the battery array 300 in order to secure the stability of the UPS and control the second power switch 120.

The communication and sensing controller may provide a user interface that is a graphical interface via which a current flow of power is displayed and provide a button for inputting settings via the user interface to operate the UPS 200. The communication and sensing controller may provide an emergency generator (EMG) switch that is provided as an image button on a touch screen or as a physical button outside the UPS according to a user interface implementation method.

The communication and sensing controller may open the first power switch 110 and the second power switch 120 via the EMG switch in an emergency situation in order to disconnect the grid 400, the UPS 200, and the battery array 300 from one another. The communication and sensing controller may selectively open the first power switch or the second power switch according to a type of emergency situation in order to selectively disconnect the grid, the UPS, and the battery array.

The UPS 200 may supply power from the grid 400 to the load 500. The battery array 300 may include backup battery units each including a lithium ion battery. The UPS system may include software for collecting information related to the UPS 200 and the battery array 300 and for controlling the second power switch 120 to control charging and discharging of the battery array based on the collected information.

Figure 2:
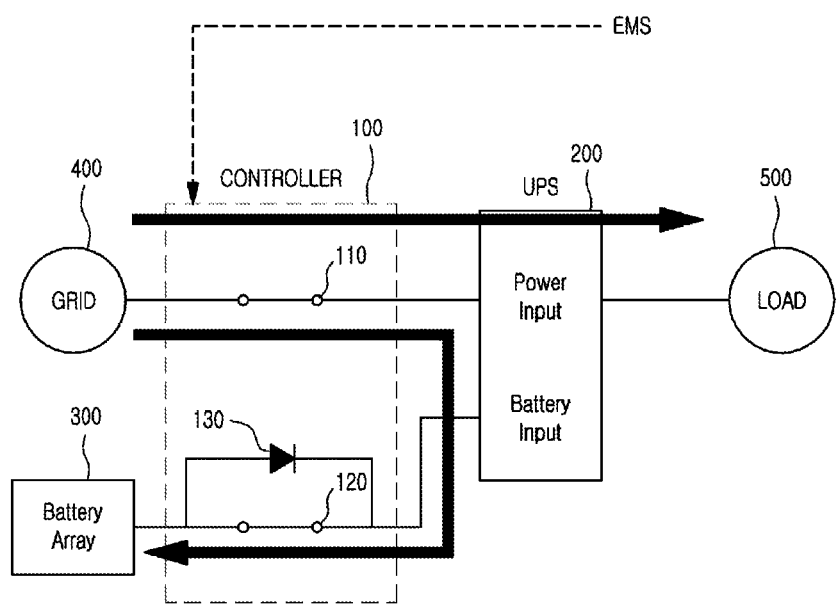
FIG. 2 illustrates the flow of power when a battery array is charged according to an exemplary embodiment of the present invention.

FIG. 2 illustrates the flow of power when the battery array 300 is charged according to an embodiment of the present invention. As illustrated in FIG. 2, the controller 100 may close the first power switch 110 and the second power switch 120 to supply power from the grid 400 to the battery array 300 in order to charge the battery array.

Some of the power supplied from the grid 400 may be first supplied to the load 500 with the remaining power used to charge the battery array 300. The controller 100 may control more power to be charged in the battery array during a period when electrical fees are cheap, such as in the middle of the night.

When the battery array 300 is charged with power, the controller 100 may control power stored in the battery array to be discharged via the diode 130. The controller 100 may also control the power stored in the battery array to be discharged in parallel by closing the second power switch 120.

Figure 3:
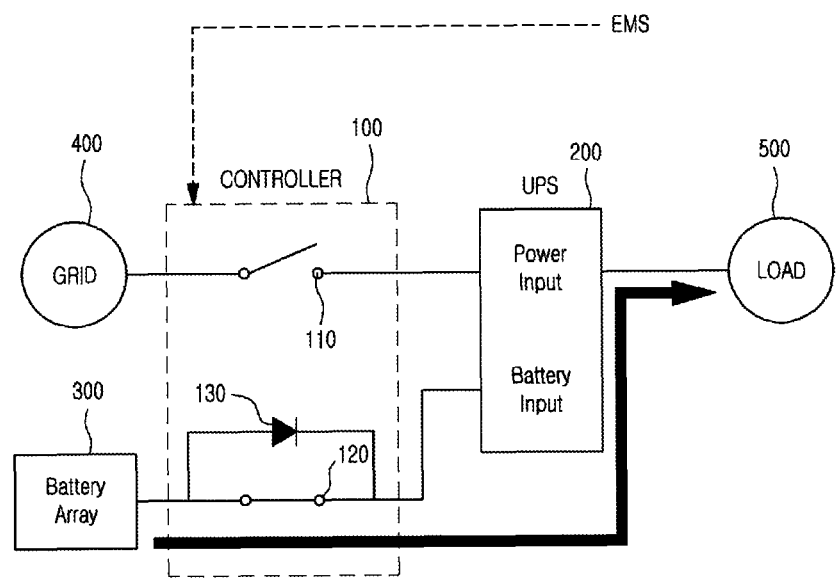
FIG. 3 illustrates the flow of power when a battery array is discharged according to an exemplary embodiment of the present invention.

FIG. 3 illustrates the flow of power when the battery array 300 is discharged according to an embodiment of the present invention. As illustrated in FIG. 3, the controller 100 may open the first power switch 110 to supply power stored in the battery array to the load 500 instead of supplying power from the grid 400.

During a peak power-consumption period or when needed, the controller 100 may open the first power switch 110 to cause the UPS 200 to recognize a current state as a power failure situation and discharge the battery array 300. The controller may measure a voltage of the battery array and close the first power switch while opening the second power switch 120 to supply power from the grid 400 to the load 500 when it is determined that the battery array is discharged to a predetermined level or more based on the measured voltage.

When the first power switch 110 is opened to stop the supply of power from the grid 400, the controller 100 may control power stored in the battery array 300 to be supplied to the load 500 via the diode 130. The diode may function as a path via which the power stored in the battery array is supplied to the load due to a power failure.

Figure 4:
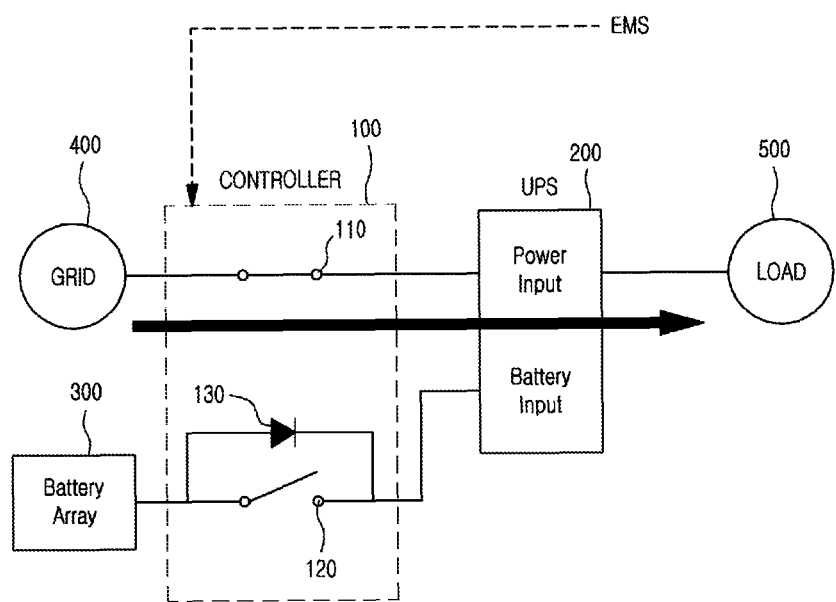
FIG. 4 illustrates the flow of power when power is supplied from a grid according to an embodiment of the present invention.

FIG. 4 illustrates the flow of power when power is supplied from the grid 400 according to an embodiment of the present invention. As illustrated in FIG. 4, the controller 100 may close the first power switch 110 to supply power from the grid 400 to the load 500.

During periods other than a peak power-consumption period, the controller 100 may close the first power switch 110 to allow the UPS 200 to supply power to the battery array 300 without discharging the battery array. The controller may check electrical fees related to power supplied from the grid 400, close the second power switch 120 to connect the charging path in order to charge the battery array with power supplied from the grid 400 when the electrical fees are determined to be low, and open the second power switch to disconnect the charging path in order to not charge the battery array with power supplied from the grid when the electrical fees are determined to be high.

According to the related art, when power is supplied to a UPS 200 by closing a first power switch that is an internal switch, not only power to be supplied to a load but also power to be used to charge a battery are needed until the battery is completely charged by the UPS. According to the present invention, this problem may be solved by selectively blocking a battery from being charged at an undesirable time by selectively connecting or disconnecting a charging path.

According to the present invention, even if a second power switch is opened to block a battery from being charged, the battery may be charged via a diode installed in parallel to the second power switch in order to stably supply power.

According to the present invention, a decrease in the efficiency of power use caused when a battery is discharged only via a diode may be prevented by discharging the battery in parallel by closing the second power switch.

Advantages of the present invention are not limited to the advantages described herein and should be understood as including all various effects that are derivable from the detailed description or the claims of the present invention The embodiments have been described for a better understanding of the present invention. It would be obvious to those of ordinary skill in the art that the present invention may be embodied in many different forms without departing from the technical idea or essential characteristics of the present invention.

Therefore, the embodiments should be considered in descriptive sense only and not for purposes of limitation. For example, components that have been described as provided in a single form may be provided in plural. Similarly, components that have been described as being distributed may be combined.

The scope of the present invention is defined in the following claims and all modifications, equivalents, and alternatives that are derivable from the description herein and the claims and equivalent concepts are construed as being within the scope of the present invention.

What is claimed is:
1. A power supply (PS) system, comprising:
   an uninterruptible power supply (UPS) configured to supply power from a grid to either a load or battery array that are external to the UPS, the battery array configured to provide power to the UPS or be charged with power supplied from the UPS; and a controller provided between the UPS and both the grid and the battery array, the controller configured to:
selectively supply the power from the grid or the battery array to the load via the UPS; and
selectively supply the power from the grid to the battery array by controlling a charging path between the UPS and the battery array.

2. The system of claim 1, wherein the controller comprises a first power switch connected between the grid and the UPS and the controller is further configured to:
control the first power switch during a first event period such that power from the grid is not provided to the UPS; and
control the first power switch during a second event period such that power from the grid is provided to the UPS.

3. The system of claim 2, wherein the controller further comprises a second power switch and a diode connected in parallel with the first power switch and the controller is further configured to:
open the first power switch and second power switch such that power stored in the battery array is discharged to the UPS;
open the first power switch and close the second power switch such that power stored in the battery array is discharged to the UPS; and
close the first power switch and second power switch such that power from the grid is supplied to charge the battery array.

4. The system of claim 3, wherein the controller is further configured to close the first power switch and open the second power switch when power stored in the battery array is discharged to a predetermined level such that power from the grid is supplied to the load and is not supplied to the battery array such that the battery array is not charged with the power from the grid.

5. The system of claim 2, wherein:
the first event period is a peak power-consumption period during which a maximum amount of power is used; and
the second event period is a period other than the first event period.

6. The system of claim 1, wherein the controller is further configured to selectively control power stored in the battery array to be discharged in consideration of electrical fees.

7. The system of claim 6, wherein the controller is further configured to:
compare an electrical fee for charging the battery array with an electrical fee for discharging the battery array;
control less power stored in the battery array to be discharged when the electrical fee for charging is less than the electrical fee for discharging; and
control more power stored in the battery array to be discharged when the electrical fee for charging is greater than the electrical fee for discharging.

8. The system of claim 6, wherein the controller is further configured to selectively control power stored in the battery unit to be discharged in consideration of a lifespan of the battery array.

9. The system of claim 1, wherein the controller is further configured to selectively control the charging path in order to maintain a state of charge of the battery array within a predetermined range.

10. The system of claim 9, wherein the controller is further configured to:
connect the charging path when a state of charge (SoC) of the battery array is less than the predetermined level; and
disconnect the charging path when the SoC of the battery array is equal to or greater than the predetermined level.

11. The system of claim 1, wherein:
the battery array comprises a plurality battery units; and
the controller is further configured to control charging paths between the plurality of battery units and the UPS according to a predetermined priority.

12. The system of claim 1, wherein the controller comprises a communication and sensing controller configured to communicate with an energy management system (EMS), the UPS, and a battery management system (BMS) that monitors a state of the battery array in order to measure a voltage of the battery array in real time.

13. The system of claim 12, wherein the communication and sensing controller is further configured to provide a communication interface of at least the UPS, the BMS or the EMS.

14. The system of claim 12, wherein the communication and sensing controller is further configured to disconnect the grid, the UPS, and the battery array from each other via an emergency generator (EMG) switch.

15. The system of claim 12, wherein the communication and sensing controller is further configured to provide a user interface via which power flow is displayed.

16. The system of claim 1, wherein the controller is further configured to:
collect information related to the UPS and the battery array; and
control the charging path based on the collected information.

17. A method of controlling a power supply (PS) system, the method comprising:
selectively supplying power to an external load via an uninterruptible power supply (UPS), the power provided from a grid or battery array that are external to the UPS; and
selectively supplying the power from the grid to the battery array by controlling a charging path between the UPS and the battery array.

18. The method of claim 17, wherein selectively supplying the power from the grid to the a battery array comprises controlling the charging path such that the battery array is not charged with power from the grid when power stored in the battery array is discharged to a predetermined level.

19. The method of claim 17, further comprising:
not providing power from the grid to the UPS during a first event period; and
providing power from the grid to the UPS during a second event period,
wherein the first event period is a peak power-consumption period during which a maximum amount of power is used and the second event period is a period other than the first event period.

20. The method of claim 17, further comprising:
selectively controlling power stored in the battery array to be discharged in consideration of at least electrical fees or a lifespan of the battery array.

* * * * *